Jan. 20, 1959 T. A. OXLEY 2,870,404

MEASUREMENT OF MOISTURE CONTENT

Filed Oct. 19, 1955 3 Sheets-Sheet 1

INVENTOR
Thomas Alan Oxley

ATTORNEY

2,870,404
Patented Jan. 20, 1959

2,870,404

MEASUREMENT OF MOISTURE CONTENT

Thomas Alan Oxley, Iver, England, assignor to Scottish Mechanical Light Industries Limited, Ayr, Scotland, a company of Great Britain Application October 19, 1955, Serial No. 541,399

Claims priority, application Great Britain October 23, 1954

15 Claims. (Cl. 324—65)

This invention relates to the measurement of moisture content of a mass of loose material, primarily a granular mass such as a mass of cereal grains and is based upon the method of measuring the electrical resistance of paths through the mass which are determined by electrodes plunged into the mass. The upper and lower limits which can conveniently be measured in this way depend in part on the lower and upper limits respectively of resistance which can conveniently be measured. It depends in part also on the moisture content of the material, because there is usually a minimum value below which and a maximum value above which there is no significant change in resistance with moisture content. For example with non-oily feed grains, these limits are about 7 and 24 percent respectively.

An object of the invention is to provide a method of effecting the measurement and an arrangement of electrodes by which the method can be practiced and which enables the resistance to be measured to be brought within the range of convenient measurement for moisture contents lying within the commercially important range.

According to the invention at least four substantially linear, substantially parallel electrical path terminations are established in the material, the terminations being in two groups as nearly equal in number as possible and of opposite electrical polarity, any termination of one polarity being at substantially the same predetermined minimum spacing from at least two terminations of the other polarity, so that there are at least twice as many direct paths through the material the length of which is equal to the said spacing, as there are terminations of one polarity, each such direct path being of surface form, and at least two paths intersecting at each termination. The electrical resistance is then measured between the two groups of terminations.

As above pointed out there are at least four terminations, but the number may be increased. The total resistance will depend on the number, their length and their spacing. Their maximum possible length will depend on the size of the mass of material, and the spacing, as will be explained further below, will need to be determined with reference to the size of the granules.

The terminations may be of substantially straight line form so that the direct paths are of substantially plane form, and the direct paths intersecting at any one termination may be perpendicular to one another. Thus the terminations may be arranged equally spaced in rows and columns with the terminations at the intersections of the rows and columns, the alternate terminations in both the rows and columns being connected outside the material into two respective groups of opposite polarity between which the electrical resistance is measured.

The apparatus according to the invention is an electrode assembly which incorporates the necessary external connections and can conveniently be thrust into the granular mass to establish the electrical path terminations therein. It comprises a support, a plurality of pointed rod like electrodes carried by the support in fixed parallel relationship in an orderly formation, for example at least four carried by the support at the intersections of equally spaced rows and columns, and means interconnecting the electrodes into two groups one insulated from the other, adjacent electrodes in any line of electrodes parallel to the sides of the formation appertaining to the two respective groups and in the case of electrodes in rows and columns those of one group alternate with those of the other in the rows and columns. With larger numbers of electrodes than four, it will usually be possible to regard the electrodes also as arranged in other lines, for example in lines at 45° in the case of rows and columns at right angles to one another, but the alternating sequence called for by the invention only applies to the rows and columns.

The electrodes may conveniently be arranged in a rectangular formation. By way of example they may be arranged in a square consisting of four, nine or sixteen electrodes, while an oblong arrangement might include six, twelve or twenty.

To enable the electrodes to be thrust for example through sacking with the minimum of damage, not only should they be sharply pointed and of small diameter (if of circular section) while being stiff enough to resist physical damage but they must also be either straight or curved circularly or helically about a common axis. Their lengths may be all equal or preferably they may be in groups of somewhat different lengths so that the points do not all penetrate the sacking simultaneously.

To avoid the measurement from being affected by the moisture content of sacking or by surface condensation upon grain in a bin or upon a bale of hay, insulation may extend from the support for a short distance around each electrode. To permit easy penetration the surface of this insulation may run smoothly into the surface of the electrode at the end of the insulation remote from the support, while for the sake of strength the insulation may widen towards the support.

For use with cereal grains or the like, the electrodes should be long enough to reach the centre of a normal grain sack when pushed in from one side.

The separation of the electrodes must be such that the grains will not bridge the gap and will lie more or less normally between them without excessively abnormal proportions of air space, i. e., the separation should be greater than the mean larger dimension of the grains and preferably several times that dimension. This becomes important with grains of the size of maize or small beans. Also, the area of contact between the grains and electrodes should be great enough to ensure a good statistical average of contact resistances.

A particularly convenient way of effecting the resistance measurement is by the use of an ohmmeter. Though alternating current could be used, direct current is preferred and such a supply may be provided by a hand-operated generator at say 200 volts or more. The generator, ohmmeter and electrode assembly may be combined into a single current. The generator may desirably incorporate a centrifugal clutch or the like, to limit the voltage, as in known types of resistance measuring instruments. Such instruments often operate at a voltage of about 500 volts and this has the advantage that the measurement is not unduly affected by extremely thin layers of non-conducting material such as grease on the electrodes which might impose a threshold voltage. It also makes the measurement easier and more reliable. An advantage of a constant voltage is that the measurement itself may vary somewhat according to the voltage, though the variation is not great. For a particular size and arrangement of electrodes, and for a particular granular material the ohmmeter may be calibrated directly in terms of moisture content. Since the reading will only be correct at one temperature, the instrument may also be provided with a thermometer and with a correction chart by which the reading obtained can be corrected according to the temperature at which the measurement is made.

An embodiment of the invention will now be described, by way of illustration, with reference to the accompanying diagrammatic drawing which shows a device which is suitable for the testing of cereal grain in sacks.

Figures 1, 2:
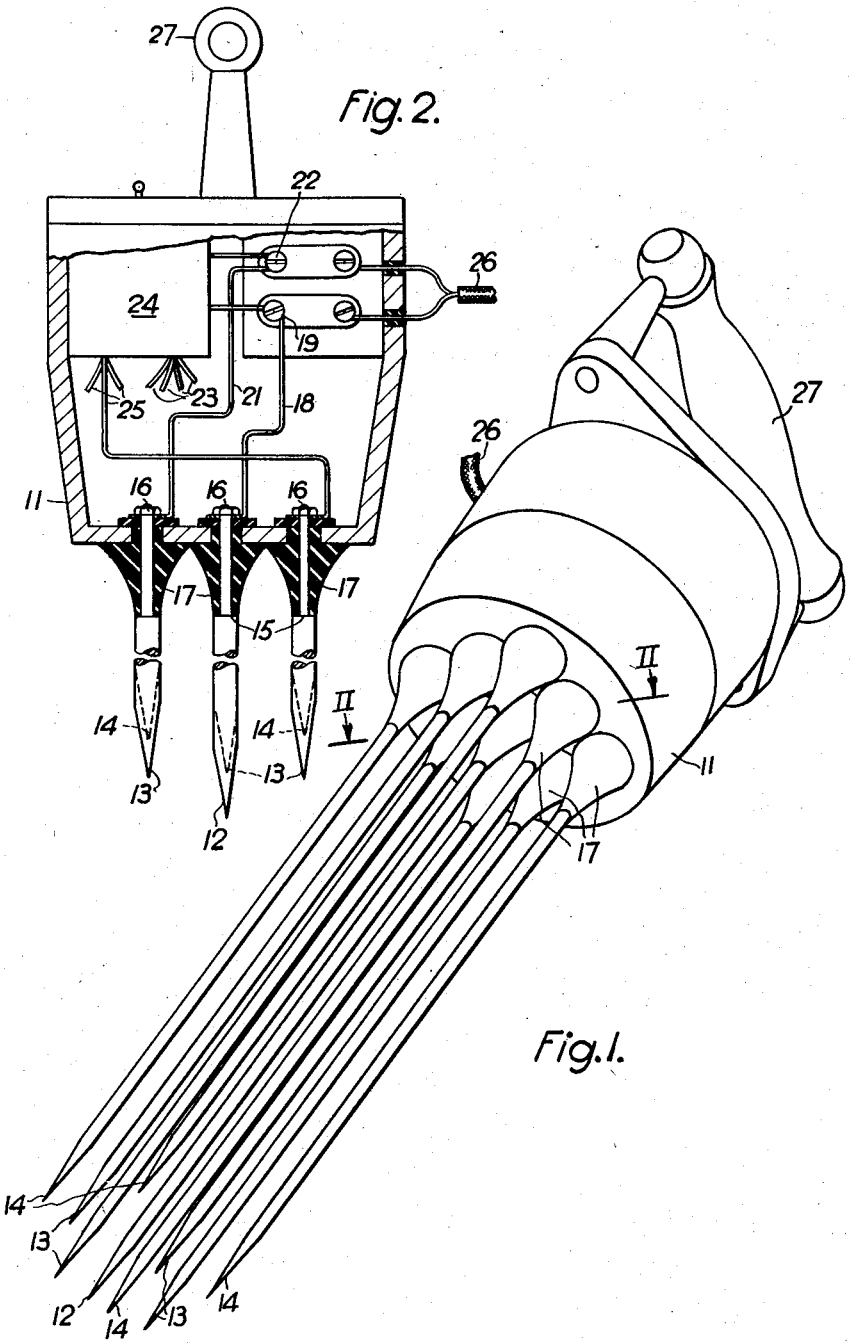
Fig. 1 is a perspective view of the complete device.
Fig. 2 is a cross section taken on the line 2—2 of Fig. 1 on an enlarged scale.

In the example illustrated nine electrodes are mounted upon a support 11 in a square formation, all of the electrodes being parallel and disposed at equal separation from adjacent electrodes.

The outer ends of the electrodes are sharply pointed to permit easy penetration of a sack and to make the penetration still easier they are not all of the same length. Thus, in the example illustrated the central electrode 12 is longest, four electrodes 13 at the centres of the sides of the square are next longest and the four corner electrodes 14 are shortest. The differences in length are quite small. Their effect is that the penetration of the sacking or the like is effected in stages.

Each of the electrodes may be 3/16 inch (4¾ mm.) diameter, and their average length may be about 7¾ inch (200 mm.) The electrodes may be 9/16 inch (14½ mm.) centre to centre, and may be made of steel chromium-plated or preferably of stainless steel, and polished. Each electrode is shouldered at 15 and held by a nut 16, a covering 17 of insulating material insulating the electrode from the support. These coverings 17 may extend for about ½ inch (12½ mm.) from the support 11 and thus prevent the moisture of sacking or of the surface layer of grain from affecting the measurement. So that they may not hinder penetration, the surfaces of the coverings run smoothly into those of the electrodes and for the sake of strength they widen towards the support.

The central electrode 12 has a direct connection 18 leading to a terminal 19 and one of the electrodes 13 has a direct connection 21 leading to a terminal 22. The electrodes 14 have connections 23 leading to one pole of a double pole switch 24 by which they can all be connected to or disconnected from the terminal 19, and the remaining electrodes 13 have connections 25 leading to the other pole of the switch 24 by which they can all be connected to or disconnected from the terminal 22. Normally the switch 24 will be closed so that the electrodes are connected in two groups to the terminals, one group comprising the electrodes 12 and 14 and the other the electrodes 13. Thus in any line parallel to the sides of the square formation, adjacent electrodes belong to the respective groups and when the apparatus is in use adjacent electrodes both in the rows and in the columns are of opposite polarity.

When the switch 23 is open, only the electrode 12 and one electrode 13 are connected to the terminals. This connection is useful for example in measuring the higher ranges of moisture content. Alternatively to a double pole switch, a similar result could be obtained by providing a single pole switch in one group of the electrodes. Then when the switch is open, one electrode of one group and the whole of the other group will be connected to the terminals. Where this provision is not wanted, the switch can be omitted, all of the electrodes 12 and 14 being directly connected to one terminal and all of the electrodes 13 to the other.

The terminals 19, 22 serve for connection of the electrodes to a generator and ohmmeter, a cable 26 being indicated for this purpose.

A handle 27 provides a convenient means of holding the device and inserting the electrodes into sacks, bales of hay or stray, bins of cereal grain or into any other mass or container of loose or granular material.

A device of the above dimensions will very conveniently measure moisture in cereal grains over the commercially important range which for non-oily seeds is from about 12 to 23 percent, by means of a conventional resistance measuring instrument employing a 500 volt supply and covering a range of 10,000 ohms to 50 megohms.

Figure 3:
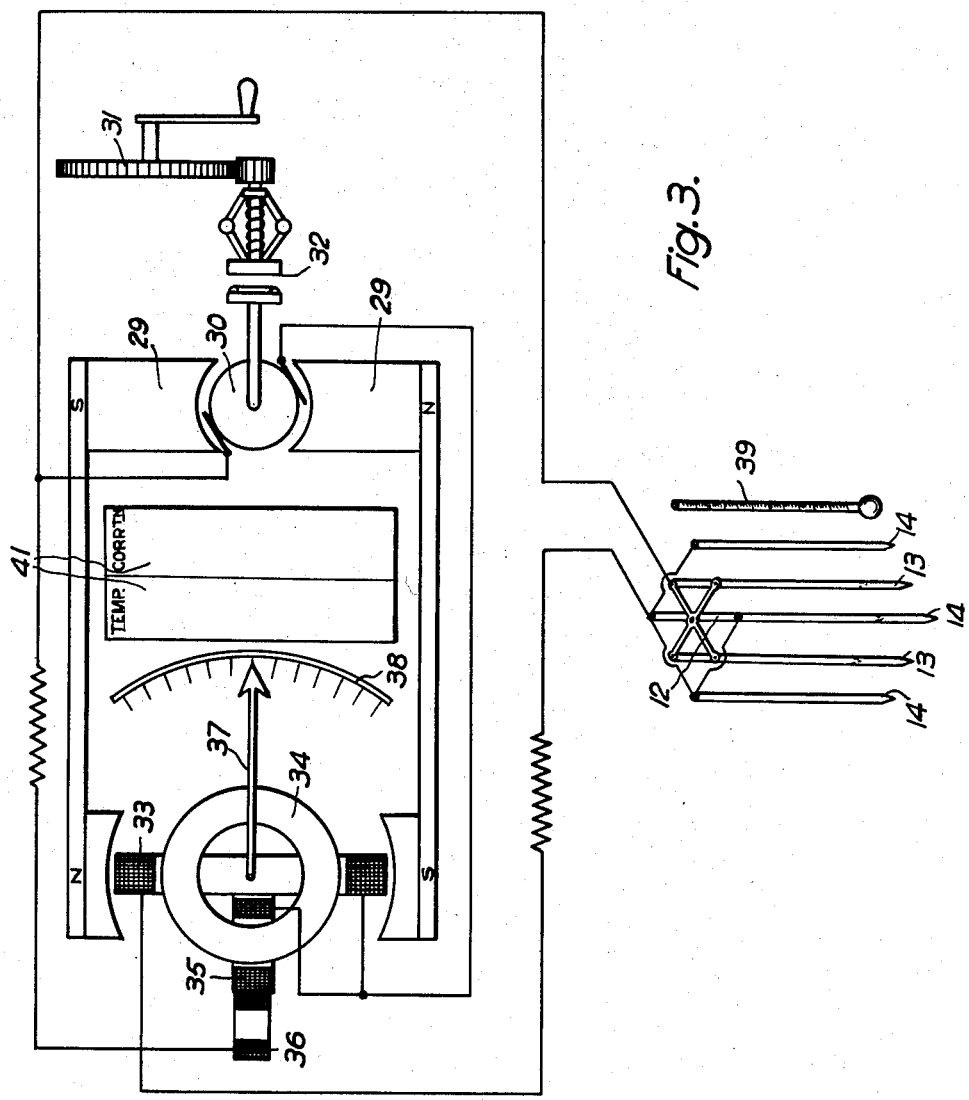
Figure 3 shows the circuit of a combination of the device with an ohmmeter, D. C. generator and thermometer.
Figure 4:
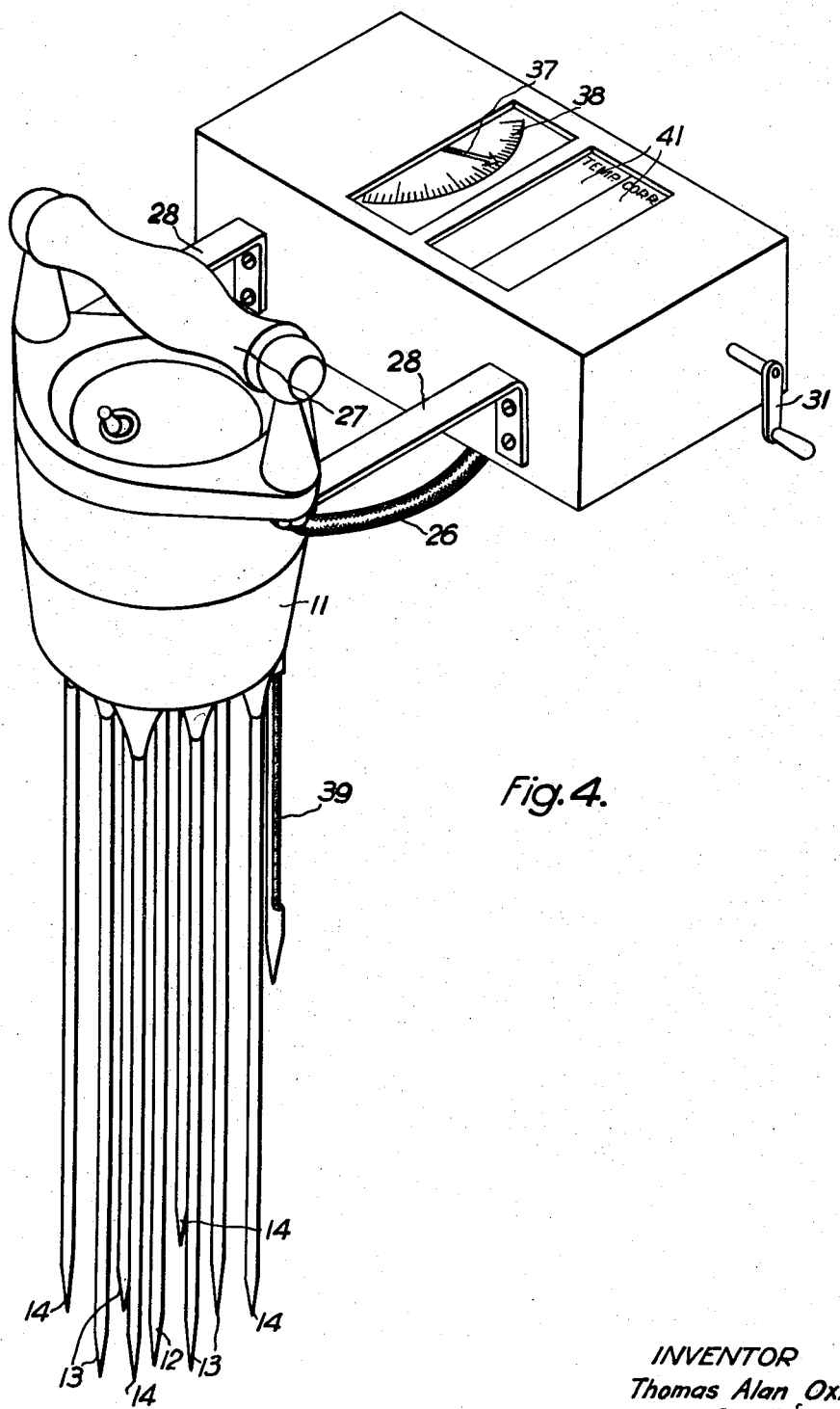
Figure 4 is a perspective view of Figure 3.

The combination of the device shown in Figures 1 and 2 with an ohmmeter is shown in Figures 3 and 4. In Figure 3 for the sake of clearness the means for supporting the electrodes 12, 13 and 14 and for switching in less than the total number of electrodes have been omitted and the electrodes are all shown of the same length, but Figure 4 shows the device complete and combined into a single instrument by a bracket 28.

The cable 26 leads to the ohmmeter which is supplied by a D. C. generator comprising a permanent field 29 and an armature 30 turned by hand gearing 31 through a centrifugally controlled clutch 32 to limit the speed. The same field magnets also provide a field for the indicating instrument which includes a current coil 33 in series with the generator armature 30 and the two sets of electrodes, which surrounds an annular core 34, a voltage coil 35 which threads the core 34 and a compensating coil 36 in series with the coil 35 but not threading the core 34, the series combination of coils 35 and 36 being connected across the generator terminals. The assembly of the coils 33, 35, 36 is fixed rigidly together and rotates about the centre of the core 34 carrying the pointer 37 moving in relation to the scale 38. The current through the coil 35 is proportional to the voltage across the generator terminals while that in the coil 33 varies with the resistance between the groups of electrodes so that the latter determines the position to which the pointer 37 will move and as above explained for a particular type of test material the scale 38 can be calibrated in terms of moisture content at a particular temperature. To enable the actual temperature to be measured a thermometer 39 is shown adjacent the electrodes and a table 41 from which corrections for temperature can be read. Further details need not be given as the construction of the ohmmeter itself is on well-known lines.

I claim:

1. Apparatus for use in the measurement of the moisture content of loose or granular material comprising a support, a plurality of pointed rod-like electrodes for insertion into the material carried by said support in fixed parallel relationship in an orderly formation, and means electrically connecting the electrodes into two groups one insulated from the other, adjacent electrodes in any line of electrodes parallel to the sides of the formation appertaining to the two respective groups.

2. Apparatus for use in the measurement of the moisture content of loose or granular material comprising a support, at least four parallel pointed rod-like electrodes carried by the support at the inter-sections of substantially equally spaced rows and columns, and means interconnecting the electrodes into two insulated groups, those of one group alternating with those of the other in the rows and columns.

3. Apparatus as set forth in claim 2 in which the number of rows is equal to the number of columns and the rows and columns are at right angles.

4. Apparatus as set forth in claim 2 in which the electrodes are straight.

5. Apparatus as set forth in claim 2 in which the electrodes are in groups of somewhat different lengths.

6. Apparatus as set forth in claim 2 also comprising insulation extending from said support for a short distance around each electrode.

7. Apparatus as set forth in claim 6 wherein the surface of the insulation extending around each electrode runs smoothly into the surface of the electrode at the end of the insulation remote from said support.

8. Apparatus as set forth in claim 7 wherein the insulation around each electrode widens towards the said support.

9. Apparatus as set forth in claim 2 wherein the spacing of the rows and columns is several times the mean larger dimension of the particles of granular material with which the apparatus is to be used.

10. Apparatus as set forth in claim 2 also comprising an ohmmeter and a source of voltage connected in series to the respective groups of electrodes.

11. Apparatus as set forth in claim 10 wherein said source is a D. C. generator having an output of at least about 200 volts.

12. Apparatus as set forth in claim 10 also comprising a thermometer adjacent the ohmmeter.

13. Apparatus as set forth in claim 9 wherein the ohmmeter is calibrated in terms of moisture content.

14. Apparatus for use in the measurement of the moisture content of grain comprising the structure of claim 1, a D. C. generator, and an ohmmeter, means combining said structure, generator and ohmmeter into a single unit, and electrical connections between said generator, ohmmeter and groups of electrodes whereby the resistance between the groups is measured on the ohmmeter by the aid of the supply furnished by the generator.

15. Apparatus for use in the measurement of the moisture content of grain comprising an insulating support, nine straight parallel pointed electrodes spaced in square formation at about 9/16 inch centre to centre and each about 7¾ inches long, means interconnecting the corner and centre electrodes into one group and the remaining electrodes into another group, a hand-operated D. C. generator having an output of about 500 volts, and an ohmmeter calibrated in terms of moisture content, said generator, ohmmeter and respective groups of electrodes being connected in series.

References Cited in the file of this patent

UNITED STATES PATENTS

| | | |
|---|---|---|
| 2,063,840 | Fairchild et al. | Dec. 8, 1936 |
| 2,082,364 | Store | June 1, 1937 |
| 2,461,111 | Flinspach et al. | Feb. 8, 1949 |
| 2,587,771 | Schoenbaum et al. | Mar. 4, 1952 |
| 2,611,006 | Delmhorst | Sept. 16, 1952 |